United States Patent [19]
Ohshima et al.

[11] Patent Number: 6,081,380
[45] Date of Patent: Jun. 27, 2000

[54] DIRECTIONAL REFLECTION SCREEN AND PROJECTION DISPLAY

[75] Inventors: Tetsuya Ohshima, Kokubunji; Yoshiyuki Kaneko, Hachioji; Akira Arimoto, Fuchu; Hiroki Kaneko, Kokubunji, all of Japan

[73] Assignee: Hitachi, Ltd., Tokyo, Japan

[21] Appl. No.: 09/263,774

[22] Filed: Mar. 5, 1999

Related U.S. Application Data

[63] Continuation-in-part of application No. 08/995,876, Dec. 22, 1997.

[30] Foreign Application Priority Data

Mar. 9, 1998 [JP] Japan .................................. 10-056739

[51] Int. Cl.$^7$ ...................................................... G02B 5/02
[52] U.S. Cl. .......................... 359/599; 359/619; 359/463
[58] Field of Search ................................. 359/599, 618, 359/619, 464, 463, 672, 455; 349/64; 362/31

[56] References Cited

U.S. PATENT DOCUMENTS

| | | | |
|---|---|---|---|
| 4,078,854 | 3/1978 | Yano | 359/458 |
| 4,871,233 | 10/1989 | Sheiman . | |
| 4,906,070 | 3/1990 | Cobb, Jr. . | |
| 5,100,222 | 3/1992 | Minoura et al. | 359/455 |
| 5,550,657 | 8/1996 | Tanaka et al. . | |
| 5,644,369 | 7/1997 | Jachimowicz et al. . | |
| 5,754,344 | 5/1998 | Fujiyama . | |

FOREIGN PATENT DOCUMENTS 10-186522  7/1998  Japan .

OTHER PUBLICATIONS

T. Izumi, "Fundamentals of Three–Dimensional Image", pp. 148–160.

T. Okoshi, "Three–Dimensional Image Engineering", pp. 28 and 91–97.

"Human Body Dimensions Data for Ergonomic Design", Research Institute of Human Engineering for Quality Life, Jun. 20, 1996, p. 79.

Primary Examiner—Cassandra Spyrou
Assistant Examiner—Euncha Cherry
Attorney, Agent, or Firm—Beall Law Offices

[57] ABSTRACT

A directional reflection screen includes a corrugated mirror sheet constituted by a plurality of mirrors, and a lens sheet for diffusing and reflecting rays of light in the direction of ridge lines of the corrugated mirror sheet. The ridge lines of the corrugated mirror sheet intersect the lens lines of said lens sheet at angles other than 90°. The projection display further includes projection means for projecting an image onto the directional reflection screen.

30 Claims, 5 Drawing Sheets

DIRECTIONAL REFLECTION SCREEN AND PROJECTION DISPLAY

CROSS-REFERENCE TO RELATED APPLICATIONS

This application is a continuation-in-part of U.S. patent application Ser. No. 08/995,876, filed Dec. 22, 1997, the entire disclosure of which is hereby incorporated by reference.

BACKGROUND OF THE INVENTION

1. Field of the Invention

The present invention relates to a projection display and, more particularly, to a directional reflection screen that is useful for realizing stereoscopic vision utilizing the binocular parallax effect.

2. Description of the Related Art

Many stereoscopic projection displays offer independent images to the right and left eyes of a viewer, realizing stereoscopic vision based on the binocular parallax effect. "Fundamentals of Three-Dimensional Image" by T. Izumi, pp. 148–160 and "Three-Dimensional Image Engineering" by T. Okoshi, pp. 28 and 91–97, disclose examples of stereoscopic projection displays that realize stereoscopic vision without the need for special eyeglasses.

FIG. 1 illustrates a stereoscopic projection display that combines a directional reflection screen constituted by a corrugated, or "corner-shaped", mirror sheet and a lens sheet having lenses disposed at right angles with respect to the mirrors of the mirror sheet, with separate projection means for right and left image receivers (for example right and left eyes). A large screen can be easily fabricated for the display because the display is of the projection type. In addition, the projected light can be efficiently supplied to a viewing range to offer high brightness since the corrugated mirror sheet features a strong horizontal directional reflection and the lens sheet features a controlled vertical diffusion.

When used with three or more projection means, the directional screen provides a correct image at a viewing point projected from the projection means, and therefore can be applied to a so-called autostereoscopic display. However, the conventional corrugated mirror sheet exhibits such a strong directivity that the viewing range is limited in the horizontal direction, and a sufficiently wide visual zone is not obtained.

When the conventional directional reflection screen is applied to an autostereoscopic display, furthermore, non-viewing regions exist among the viewing ranges of the respective projection means and appear to the viewers as missing image portions.

SUMMARY OF THE INVENTION

It is an object of the present invention to expand the viewing range of the projection display in the horizontal direction.

Another object of the present invention is to suppress the incidence of missing image portions on the projection display.

In a projection display constructed according to the teachings of the present invention, a directional reflection screen comprises a corrugated mirror sheet obtained by arranging a plurality of mirrors on a substrate, and a lens sheet for diffusing and reflecting rays of light in the direction of ridge lines that divide individual mirrors of the corrugated mirror sheet. The ridge lines of the corrugated mirror sheet intersect lens lines that divide individual lenses of the lens sheet at angles other than 90°, in a preferred embodiment. The projection display further includes projection means for projecting an image onto the directional reflection screen to be received by respective right and left image receivers, which may be the right and left eyes of a person.

The above and other objects as well as novel features of the present invention will become clear from the description of the specification and the drawings.

DETAILED DESCRIPTION OF THE PREFERRED EMBODIMENTS

Figure 1:
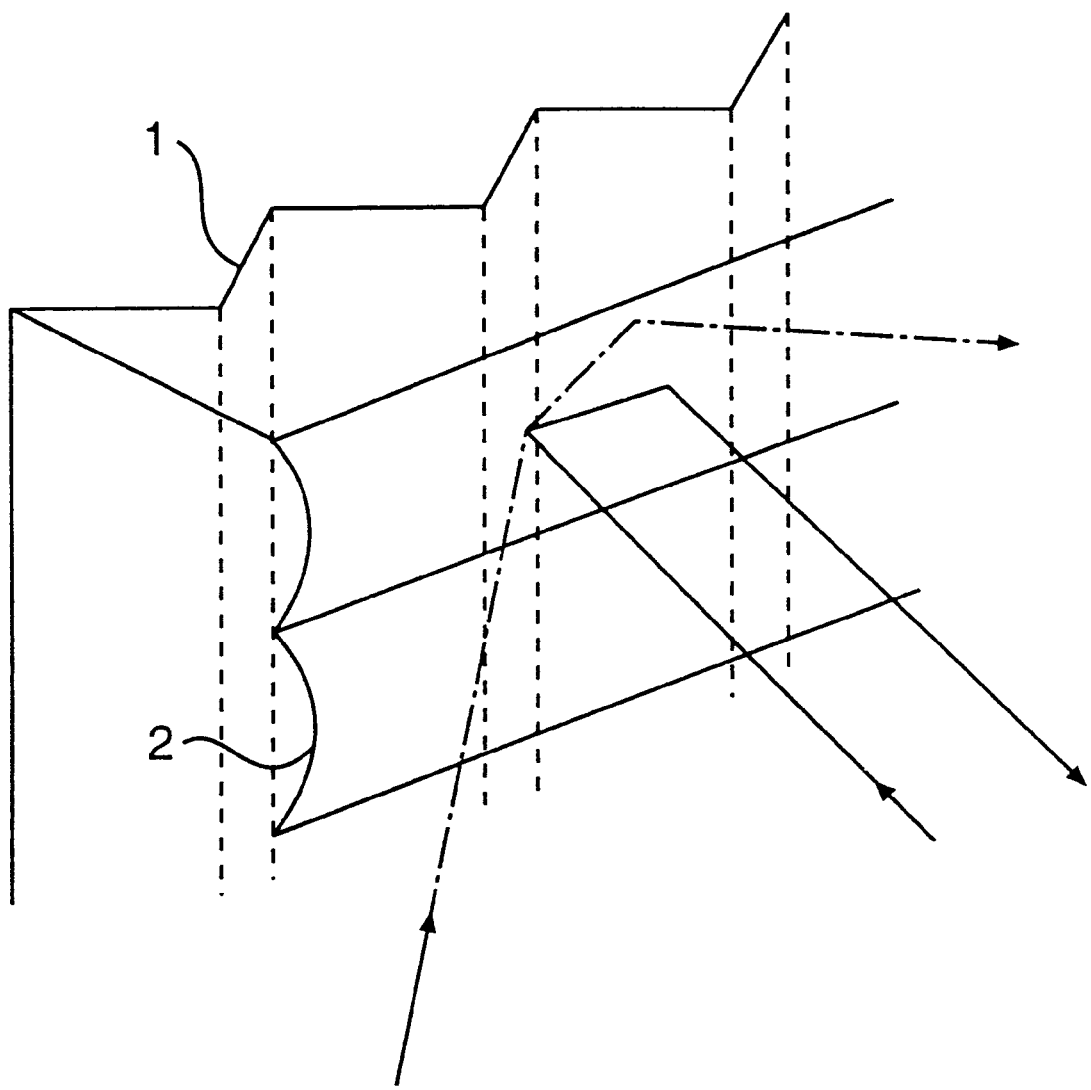
FIG. 1 schematically illustrates the basic structure of a directional reflection screen.

In the drawings illustrating the invention, those elements that have the same functions are denoted by the same reference numerals.

Figure 2:
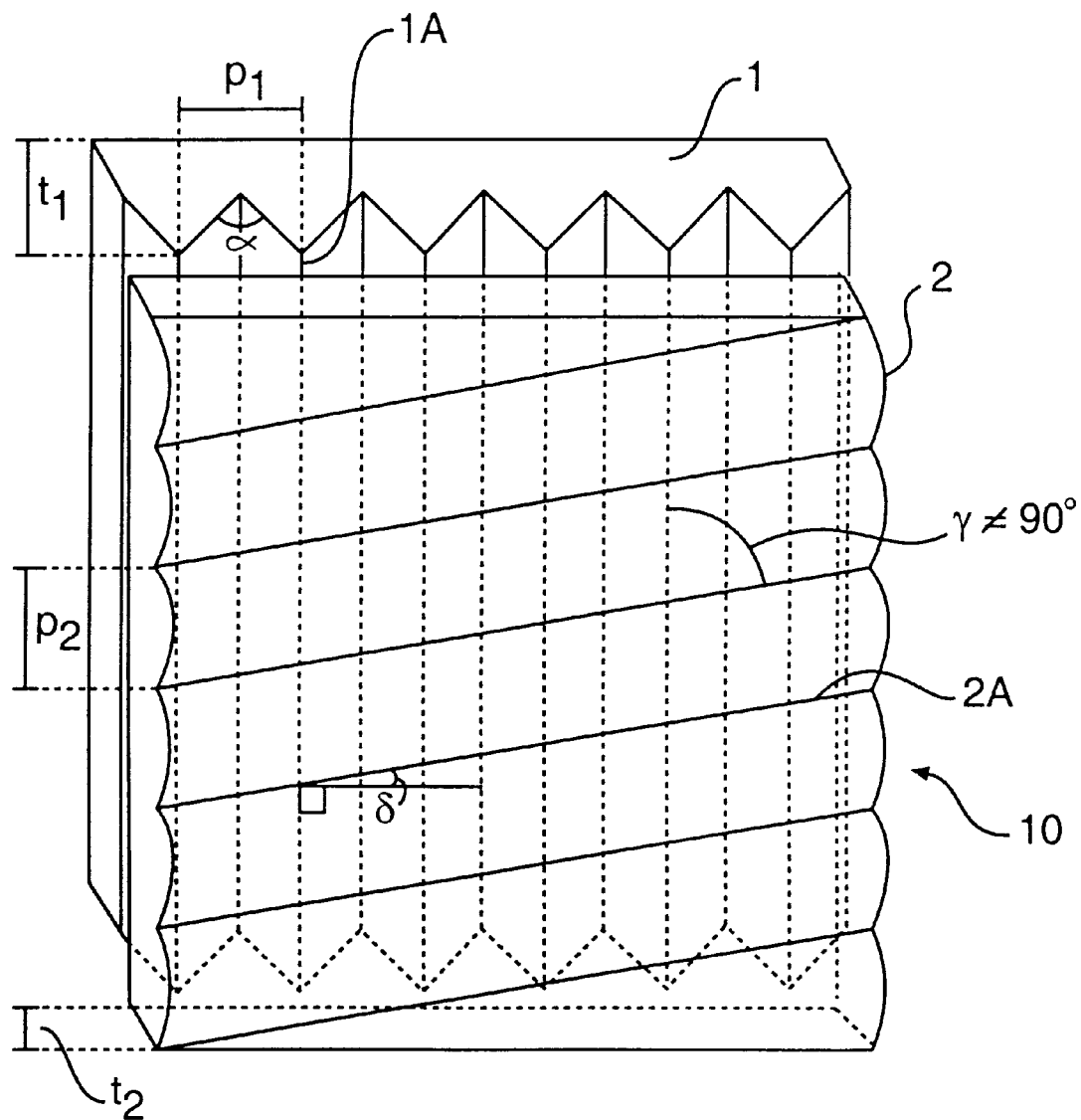
FIG. 2 schematically illustrates a directional reflection screen according to an embodiment of the present invention.

A directional reflection screen 10 according to the present embodiment comprises, as shown in FIG. 2, a corrugated mirror sheet 1 obtained by arranging a plurality of mirrors on a substrate so as to form peaks and valleys, and a lens sheet 2 for diffusing and reflecting rays of light in the general direction of ridge lines 1A of the corrugated mirror sheet 1. The ridge lines 1A are seen to divide the individual mirrors of the corrugated mirror sheet 1, and are parallel to each other in a preferred embodiment.

Illustratively, the directional reflection screen measures between 1000–4000 mm on the diagonal. The corrugated mirror sheet 1 has a mirror pitch $p_1=0.1-3$ mm, and a thickness $t_1=0.3-2$ mm. The included angle $\alpha$ may be between 60° and 120°. The lens sheet 2 has a lens pitch $p_2=0.1-3$ mm, and a thickness $t_2=0.3-2$ mm. The radius of curvature for each lens may be 0.1–3 mm. The values for the mirror sheet and for the lens sheet depend on the distance between the viewer and the directional reflection screen 10, which is preferably 1–5 m. With values in the above ranges, anywhere from 1–8 viewers can receive the projected image.

As viewed from the projection/reflection side (the "front") of the directional reflection screen 10, the ridge lines 1A of the corrugated mirror sheet 1 intersect lens lines 2A that divide individual lenses of the lens sheet 2 at angles, preferably identical, that are other than 90°. That is, the corrugated mirror sheet 1 and the lens sheet 2 are fixed together such that an angle $\gamma$ formed by a ridge line 1A of the corrugated mirror sheet 1 and a lens line 2A of the lens sheet 2 is not a right angle. An angle δ, formed by a lens line 2A and the perpendicular to a ridge line 1A intersecting the lens line 2A in the plane containing the intersecting lens line 2A and ridge line 1A, is the complement of γ (i.e., γ+δ=90°). Preferably, the ridge lines 1A are parallel to each other, and the lens lines 2A are parallel to each other.

Figure 3:
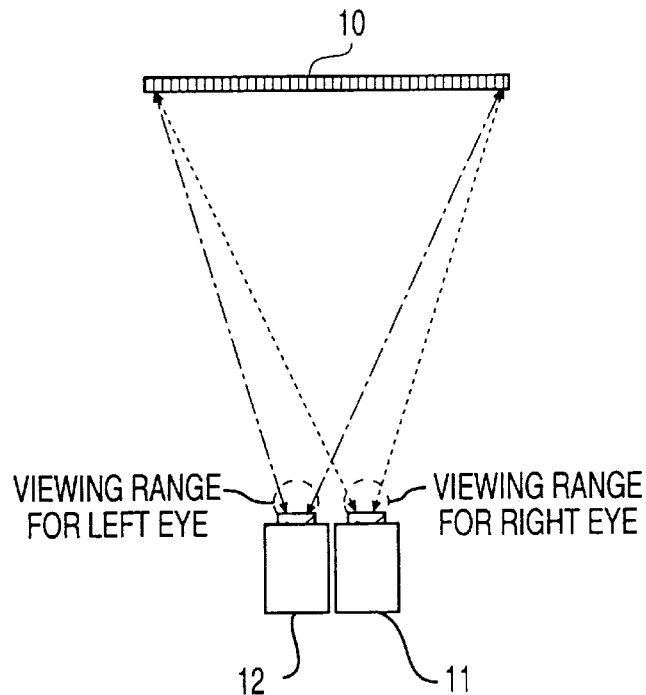
FIG. 3 illustrates a directional reflection screen according to an embodiment of the present invention, applied to a stereoscopic display.

Referring to FIG. 3, when image-bearing rays of light are projected onto the directional reflection screen 10 from a projection means 11 for the image receiver on the right (e.g., the right eye) and from a projection means 12 for the image receiver on the left (e.g., the left eye) in the stereoscopic display, the incident rays of light are successively reflected by adjacent mirrored surfaces of the corrugated mirror sheet 1 toward a direction perpendicular to the ridge lines 1A. On the other hand, the lens sheet 2 diffuses the rays of light in a direction perpendicular to the lens lines.

When the angle γ formed by a ridge line 1A of the corrugated mirror sheet 1 and a lens line 2A of the lens sheet 2 is not 90°, the diffusing action of the lens sheet 2 is applied to the directional reflection action of the corrugated mirror sheet 1 in a direction perpendicular to the ridge line 1A of the corrugated mirror sheet 1, enabling the reflected rays of line to be spread. When this is applied to a stereoscopic display, therefore, the viewing range can be widened in the horizontal direction.

Here, as γ becomes more different from 90° (i.e., as δ increases, and γ decreases), the direction in which the rays of light are diffused by the lens sheet 2 is brought close to the direction in which the rays of light are reflected by the corrugated mirror sheet. Hence, the diffusion action is further increased, making it possible to further widen the viewing range of the stereoscopic display in the horizontal direction. The angle γ is chosen based on viewing range and optical separation considerations, and is preferably chosen so that δ=|γ−90°| is between about 5° and 30°.

Figure 4:
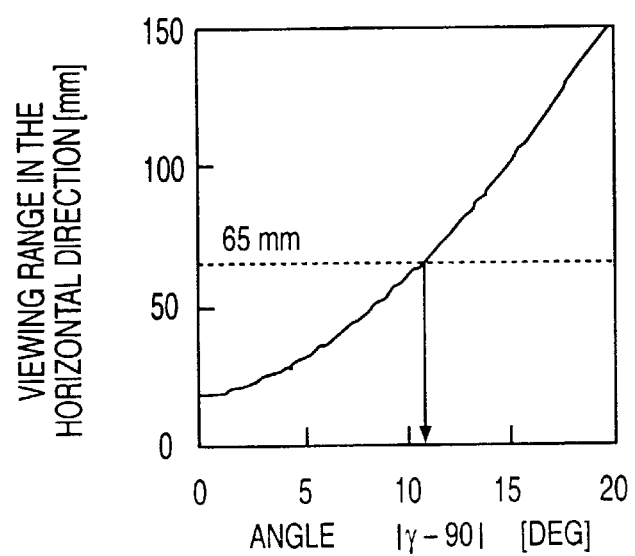
FIG. 4 is a graph of viewing range vs. angle $|\gamma-90°|$.

Owing to this constitution, when the viewing range of the directional reflection screen is set to be equal to the distance between the respective centers of the neighboring viewing ranges for the right and left eyes in the stereoscopic display, a maximum viewing range is obtained for the screen without crosstalk between the right image and the left image. FIG. 4 graphically illustrates the relationship between horizontal viewing range and the angle |γ−90°|. As shown in the figure, the viewing range increases as γ decreases; however, crosstalk also increases as the viewing range increases. At 65 mm (a typical distance between the eyes of a viewer), the distance between the eyes of a human has been reported to be between 49–74 mm (Human Body Dimensions Data for Ergonomic Design, Research Institute of Human Engineering for Quality Life, p. 79, Table A9 (1996)), |γ−90°| is approximately 11°.

In an illustrative example, the mirror sheet 1 has an included angle between each contiguous pair of adjacent mirrors, and a pitch $p_1$ of 0.16 mm. The radius of curvature of each lens in the lens sheet 2 is 0.3 mm, the lens pitch $p_2$ is 0.4 mm, and the lens sheet has a thickness $t_2$ (measured from the back surface of the lens sheet 2 to the maximum radius of a lens) of 1 mm. In this example, γ is 79°, or |γ−90°|=11°. The viewing distance is 2 m.

Figure 5:
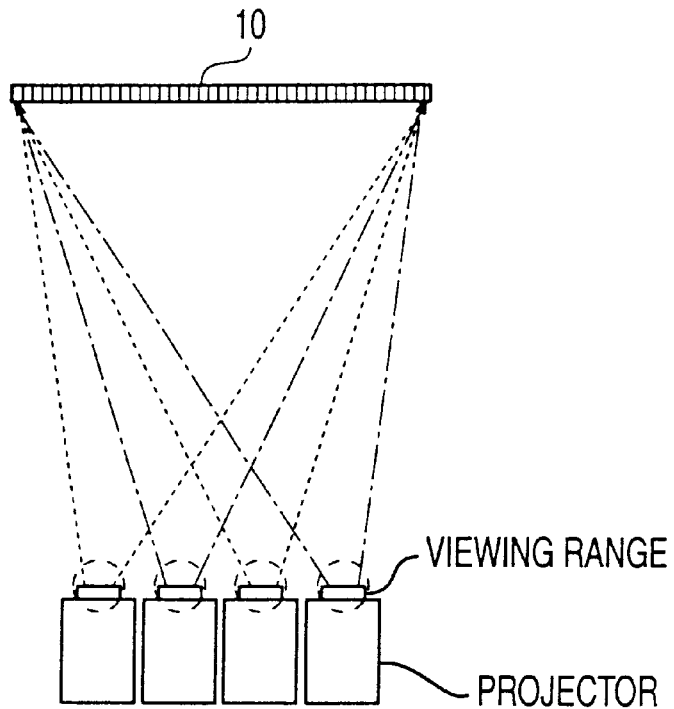
FIG. 5 shows a directional reflection screen according to an embodiment of the invention, applied to an autostereoscopic display.

In the case of an autostereoscopic display as shown in FIG. 5, multiple projectors for each viewer can be arranged horizontally as shown, to provide a favorable viewing range that is preferably set to be equal to the distance between the centers of the neighboring viewing ranges, for the reasons described above. Thus, the distance between the centers of the neighboring viewing ranges for each viewer may desirably be considered to be about 65 mm, which is a typical human eye span. Thus, the angle γ may be set so that the viewing range is about 65 mm in the horizontal direction.

Alternatively, in the autostereoscopic display shown in FIG. 5, the distance between the viewing ranges may be set to be narrower than the between-the-eyes distance, to reduce discreteness (that is, optical separation) between the neighboring right images. In this case, the angle γ may be set so that the width of the viewing range in the horizontal direction is nearly equal to the distance between the adjacent viewing ranges so set.

In the autostereoscopic display, if the number of projectors is too small, the viewing range may not be considered sufficiently large. On the other hand, as the number of projectors becomes larger, the viewing range becomes wider and the viewing environment is improved. However, as the number of projectors increases, the number of images increases, because the number of projectors and the number of images are the same. Therefore, heavy calculation power for image construction is necessary in an actual autostereoscopic display employing many projectors, and especially in the case of moving pictures. Accordingly, from this point of view, it is considered that a preferred number of projectors in an actual autostereoscopic display according to this embodiment is four.

In the directional reflection screen of the present invention, the corrugated mirror sheet and the lens sheet may be formed on the back and front surfaces, respectively, of a single substrate, as shown in FIG. 1. When they are formed on separate substrates as suggested in FIG. 2, however, the angle γ may be changed as required. Hence, the viewing width in the horizontal direction may also be changed easily.

The present invention can be effectively applied to any directional reflection screen constituted by a combination of the corrugated mirror sheet and the lens sheet, and can be particularly effectively applied to the structures of the two kinds of corrugated mirror sheets described below. Another preferred structure is shown in FIG. 6, wherein an included angle α of the corrugated mirror sheet is a right angle (each pixel contains a right included-angle component).

Figure 6:
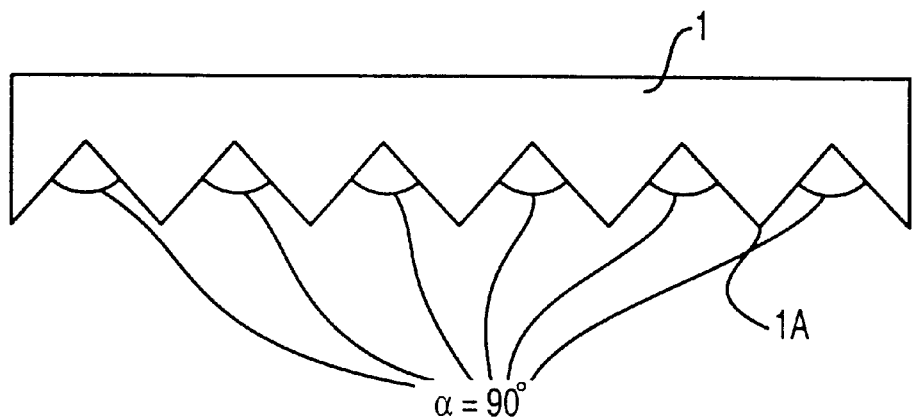
FIG. 6 illustrates a sectional structure of a corrugated mirror sheet according to an embodiment of the present invention.
Figure 7:
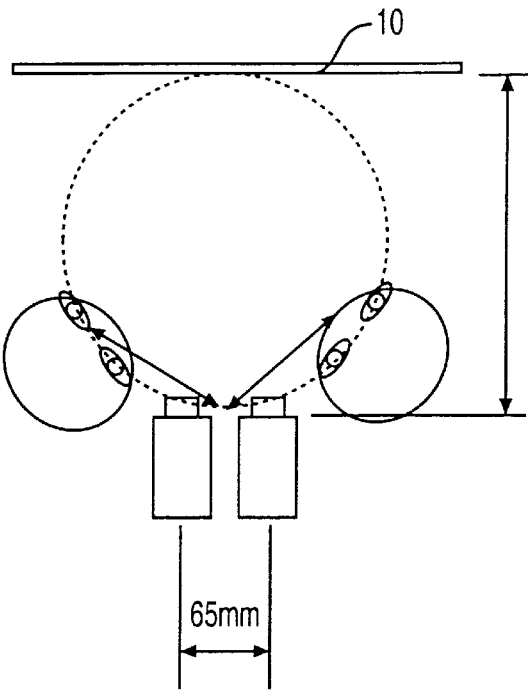
FIG. 7 illustrates an autostereoscopic display employing the directional reflection screen shown in FIG. 6.

The structure shown in FIG. 6 can be modified to make each included angle a to be different from 90°, which permits more than one person to view the directional reflection screen at a time. For example, the following parameters may be employed: for the lens sheet 2, radius of curvature =0.3 mm, pitch $p_2$=0.4 mm, and thickness $t_2$ 1 mm; for the mirror sheet 1, included angle α=80.4°, and pitch $p_1$ 0.33 mm. The viewing distance between the directional reflection screen and the projectors is 1.5 m, and γ=79° (|γ−90°|=11°). For these conditions, two viewers are preferably situated on either side of two projectors (whose objective lenses are respectively separated by 65 mm to project respective image components toward the directional reflection screen) on a circle having a diameter equal to the viewing distance (1.5 m), each viewer being spaced from the projectors by approximately 490 mm, measured from the midpoint between the objective lenses of the projectors to the midpoint of the eye span of each viewer. FIG. 7 schematically illustrates the relative positions of the projectors, the screen 10, and the two viewers (as many as eight viewers can be accommodated on the circle, depending on the diameter).

Figure 8:
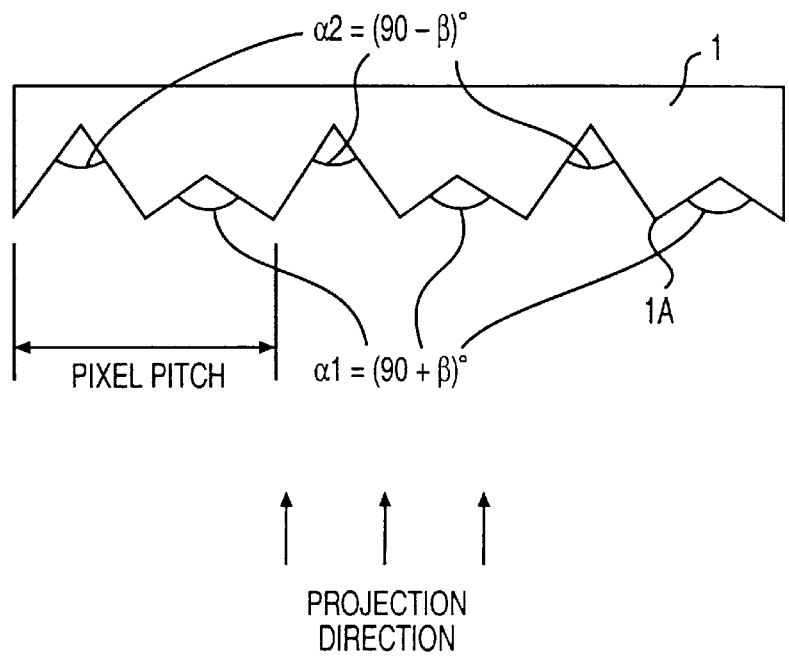
FIG. 8 schematically illustrates another sectional structure of a corrugated mirror sheet according to an embodiment of the invention.

Another structure is shown in FIG. 8, wherein the included angles of the corrugated mirror sheet are not right angles. Instead, the included angles are alternately an obtuse angle α1 and an acute angle α2 that are equally different from 90° (i.e., included angle components of $\alpha_1=(90+\beta)°$ and $\alpha_2=(90-\beta)°$ are contained in a pitch of a pixel of the projected image). When the corrugated mirror sheets have this structure, the expansion of the viewing range is exhibited particularly distinctly and effectively compared with other structures.

In a nonlimiting example, with two viewers situated as shown in FIG. 7, the distance from the directional reflection screen to the projectors (the diameter of the imaginary circle on which the viewers are positioned) is about 2 m. The lens sheet 2 has a radius of curvature of 0.3 mm for each lens, a pitch of 0.4 mm, and a thickness of 1 mm. The mirror sheet 1 has the following dimensions: $\alpha_1=98.5°$, $\alpha_2=81.5°$, $\beta=8.5°$, pitch $(\alpha_1)=0.20$ mm, pitch $(\alpha_2)=0.14$ mm, and $\gamma=79°$ ($|\gamma-90°|=11°$). The distance from the point equidistant between the left and right projectors to a point equidistant between the left and right eyes of each viewer is approximately 580 mm.

The features of the invention described above have been described with respect to an autostereoscopic display. However, the expanded viewing range is also exhibited in the projection display of a combination of a directional reflection screen constituted by the corrugated mirror sheet and the lens sheet, and a single or a plurality of projection means, though the purpose of the projection display may not be to realize a stereoscopic view.

Various modifications of the invention as set forth in the foregoing description will become apparent to those of ordinary skill in the art. All such modifications that basically rely on the teachings through which the invention has advanced the state of the art are properly considered within the spirit and scope of the invention.

We claim:

1. A directional reflection screen, comprising:
   a mirror sheet including a plurality of mirrors that are mutually contiguous at respective ridge lines and that form respective included angles between mirrored surfaces of adjacent ones of said contiguous mirrors at said ridge lines; and
   a lens sheet, including a plurality of lenses overlying said mirrored surfaces, for diffusing and reflecting rays of light incident thereto, each lens extending across said mirror sheet and defining lens lines between adjacent lenses, said lens lines forming respective angles $\gamma \neq 90°$ with respect to said ridge lines.

2. A directional reflection screen as claimed in claim 1, wherein the respective included angles between said mirrored surfaces of said adjacent ones of said contiguous mirrors at said ridge lines are all equal.

3. A directional reflection screen as claimed in claim 1, wherein the respective included angles between said mirrored surfaces of said adjacent ones of said contiguous mirrors at said ridge lines are all 90°.

4. A directional reflection screen as claimed in claim 1, wherein the respective included angles between said mirrored surfaces of said adjacent ones of said contiguous mirrors at said ridge lines are alternately $(90°-\beta)$ and $(90°+\beta)$, where $\beta$ is a positive angle less than 90°.

5. A directional reflection screen as claimed in claim 1, further comprising a substrate having front and back surfaces, wherein the lens sheet is formed on the front surface of the substrate and the mirror sheet is formed on the back surface of the substrate.

6. A directional reflection screen as claimed in claim 1, further comprising a mirror sheet substrate supporting said mirror sheet, and a separate lens sheet substrate supporting said lens sheet.

7. A directional reflection screen as claimed in claim 1, wherein the mirror sheet and the lens sheet measure 1000–4000 mm on the diagonal.

8. A directional reflection screen as claimed in claim 1, wherein the lenses of the lens sheet have a radius of curvature between 0.1–3 mm, a pitch of 0.1–3 mm, and a thickness of 0.3–2 mm.

9. A directional reflection screen as claimed in claim 1, wherein the mirrors of the mirror sheet have an included angle of 60–120°, a pitch of 0.1–3 mm, and a thickness of 0.3–2 mm.

10. A directional reflection screen as claimed in claim 1, wherein an angle $\delta=|\gamma-90°|$ formed between said lens lines and perpendicular lines to said ridge lines is between 5–30°.

11. A projection display, comprising:
    a directional reflection screen including a mirror sheet having a plurality of mirrors that are mutually contiguous at respective ridge lines and that form respective angles between mirrored surfaces of adjacent ones of said contiguous mirrors at said ridge lines, and a lens sheet a plurality of lenses overlying said mirrored surfaces for diffusing and reflecting rays of light parallel to said ridge lines, each lens extending across said mirror sheet and defining lens lines between adjacent lenses, said lens lines forming respective identical angles $\gamma \neq 90°$ with respect to said ridge lines; and
    projection means for projecting an image onto said directional reflection screen.

12. A projection display as claimed in claim 11, wherein said directional reflection screen is constructed to have a viewing range that is approximately equal to distances between the centers of respective neighboring viewing ranges.

13. A projection display as claimed in claim 11, wherein said directional reflection screen is constructed to have a viewing range of about 65 mm.

14. A projection display as claimed in claim 11, wherein said directional reflection screen is constructed to have a viewing range that is less than distances between the centers of respective neighboring viewing ranges.

15. A projection display as claimed in claim 11, wherein the respective included angles between said mirrored surfaces of said adjacent ones of said contiguous mirrors at said ridge lines are all 90°.

16. A projection display as claimed in claim 11, wherein the respective included angles between said mirrored surfaces of said adjacent ones of said contiguous mirrors at said ridge lines are alternately $(90°-\beta)$ and $(90°+\beta)$, where $\beta$ is a positive angle less than 90°.

17. A projection display as claimed in claim 11, wherein said projection display is an autostereoscopic display.

18. A projection display as claimed in claim 11, wherein said directional reflection screen further includes a substrate having front and back surfaces, wherein the lens sheet is formed on the front surface of the substrate and the mirror sheet is formed on the back surface of the substrate.

19. A projection display as claimed in claim 11, wherein said directional reflection screen further includes a mirror sheet substrate supporting said mirror sheet, and a separate lens sheet substrate supporting said lens sheet.

20. A projection display as claimed in claim 11, wherein the mirror sheet and the lens sheet measure 1000–4000 mm on the diagonal.

21. A projection display as claimed in claim 11, wherein the lenses of the lens sheet have a radius of curvature between 0.1–3 mm, a pitch of 0.1–3 mm, and a thickness of 0.3–2 mm.

22. A projection display as claimed in claim 11, wherein the mirrors of the mirror sheet have an included angle of 60–120°, a pitch of 0.1–3 mm, and a thickness of 0.3–2 mm.

23. A projection display as claimed in claim 11, wherein an angle $\delta=|\gamma-90°|$ formed between said lens lines and perpendicular lines to said ridge lines is between 5–30°.

24. A projection display as claimed in claim 11, wherein said projection display has exactly four of said projection means.

25. A projection display as claimed in claim 11, wherein said directional reflection screen is constructed to have a viewing range between 49–74 mm.

26. A method for projecting an image, comprising the following steps:

projecting first and second binary components of a three-dimensional image from respective projectors onto a directional reflection screen, said directional reflection screen including a mirror sheet having a plurality of mirrors that are mutually contiguous at respective ridge lines and that form respective angles between mirrored surfaces of adjacent ones of said contiguous mirrors at said ridge lines, and a lens sheet a plurality of lenses overlying said mirrored surfaces for diffusing and reflecting rays of light parallel to said ridge lines, each lens extending across said mirror sheet and defining lens lines between adjacent lenses, said lens lines forming respective identical angles $\gamma \neq 90°$ with respect to said ridge lines; and reflecting the first and second binary components from the directional reflection screen toward firsthand second image receivers that have respective viewing ranges.

27. A method for projecting an image as claimed in claim 26, wherein said directional reflection screen has a viewing range that is approximately equal to a distance between the centers of the respective viewing ranges of the first and second image receivers.

28. A method for projecting an image as claimed in claim 26, wherein said directional reflection screen has a viewing range of about 65 mm.

29. A method for projecting an image as claim 26, wherein said directional reflection screen has a viewing range that is less than a distance between the centers of the respective neighboring ranges of the first and second image receivers.

30. A method for projecting an image as claimed in claim 26, wherein said directional reflection screen is constructed to have a viewing range between 49–74 mm.

* * * * *